INVENTORS
Clayton E. Gifford and
BY John F. Harrison
Oberlin, Limbach & Day
ATTORNEYS.

Sept. 16, 1941.    C. E. GIFFORD ET AL    2,256,144
HYDRAULIC CONTROL SYSTEM
Filed March 27, 1939    3 Sheets-Sheet 2

INVENTORS
Clayton E. Gifford and
BY John F. Harrison
Oberlin, Limbach & Day
ATTORNEYS.

Sept. 16, 1941.  C. E. GIFFORD ET AL  2,256,144
HYDRAULIC CONTROL SYSTEM
Filed March 27, 1939  3 Sheets-Sheet 3

INVENTORS
Clayton E. Gifford and
BY  John F. Harrison
Oberlin, Limbach & Day
ATTORNEYS Patented Sept. 16, 1941

2,256,144

UNITED STATES PATENT OFFICE 2,256,144

HYDRAULIC CONTROL SYSTEM

Clayton E. Gifford and John F. Harrison, Marion, Ohio, assignors to The Huber Manufacturing Company, Marion, Ohio, a corporation of Ohio Application March 27, 1939, Serial No. 264,314

3 Claims. (Cl. 60—52)

This invention relates, as indicated, to hydraulic control systems and more particularly to the control of hydraulic systems employed for the purpose of actuating hydraulic jacks and the like such as are commonly employed for the purpose of performing functions which have previously been performed by gears, mechanical linkages, and the like.

Our invention can best be explained by having reference to a particular type of hydraulically actuated or controlled equipment since the advantages which accrue in such equipment will make evident the corresponding advantages which may be secured when our control system is employed in other types of equipment. Taking, for example, therefore, a road working machine such as a road grader, those skilled in the art will appreciate that the various controls on a road grader such as steering, raising and lowering the blade or scarifier, etc., have usually been effected by purely mechanical means such as by gears, links and levers, and in the early stages of the development of this art, motive power was largely if not entirely manual.

With the advent of larger machines and the requirements incidental to higher speeds of operation, power means have been employed for the purpose of performing the functions previously performed manually. The first expedient to which the workers in the art resorted was the obvious use of gears and similarly powered levers usually driven by the engine furnishing the motive power for the machine. When a single prime mover is employed from which all of the power in the unit is derived, it will be evident that there will be some relationship between the speeds of operation of the several devices actuated by such prime mover. When a single power unit is connected to the motor such as for the purpose of raising and lowering the blade of the grader, some complications arise since the rate at which the blade is raised and lowered will be related to the speed of travel of the vehicle unless elaborate means are provided for changing the relative speed of the prime mover and the moved part as by way of expensive change speed gearing and the like. Now when other units of the grader are integrated with the power unit as, for example, the steering mechanism, additional complications arise and as the number of units connected to the prime mover is increased the entire machine has a tendency to become more inflexible.

As may be expected, various expedients have been proposed for overcoming these difficulties.

As indicated, change speed gearing has been employed. However, this is usually unsatisfactory due to the initial cost and maintenance thereof. It is also objectionable on account of the complexity of the controls required to operate the equipment.

Hydraulic control apparatus has also been adapted for use on equipment of this character and this type of control has particular appeal on account of its well-known simplicity, flexibility and ease of operation. When a hydraulic control system is adapted to a grader, however, the means providing the fluid under pressure, usually a gear pump or the like, is usually for economy's sake power coupled to the prime mover of the equipment so that the same objections from the standpoint of inflexibility have arisen in connection with the use of the hydraulic system as were encountered in the purely mechanical system. The relative speeds at which the several units of the assembly are to be operated under most conditions can be roughly approximated. Such rough approximation, however, must of necessity be rather arbitrary and obviously cannot satisfy nearly all of the flexibility which it would be desirable to have available. This rough approximation has been sometimes accomplished by making the cylinders of the several hydraulic jacks of different size inversely proportional to the rate at which it was desired that they should move. That is, with a given rate of fluid supply from the pressure pump a piston having a given cross-sectional area would move twice as fast as a piston having twice the same effective cross-sectional area. This expedient has been quite satisfactory, usually so on account of the inflexibility still present, and further on account of the high cost involved. In other words, each jack on the machine would have to be of a size particularly suited to the work it was to perform, making it necessary to construct a large number of different sizes of jacks as well as the auxiliary parts employed in conjunction therewith such as bushings, etc.

Another disadvantage to hydraulic systems as employed heretofore in equipment of this character is that during the time when the jacks were not being actuated in one direction or another all of the oil delivered by the force pump was by-passed back to the sump. This circulation of the oil under high velocity and continuously throughout the operation of the prime mover on the equipment usually resulted in such an over-heating of the oil as to detrimentally affect the operation and operative life of the equipment.

It is a principal object of our invention to provide a hydraulic system which is provided with a control device whereby much of the desired flexibility heretofore never achieved is now accomplished and even though the several jacks on the machine are of the same size.

It is a further object of our invention to provide a control system of the character described in which the amount of unnecessary re-circulation of the oil or similar hydraulic fluid during the time when the jacks are not actually being operated is reduced to a very minimum, permitting, however, a sufficient amount of re-circulation in order to maintain the various operative parts properly lubricated.

Other objects of our invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 12:
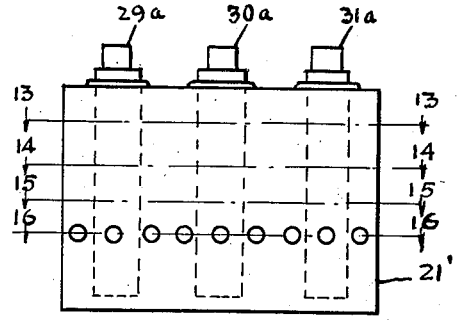
Fig. 12 is a side elevational view of a modified form of central control valve similar to that illustrated in Fig. 8.
Figure 15:
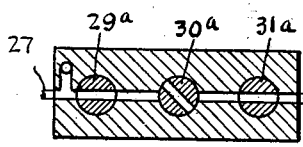
Figure 15A:
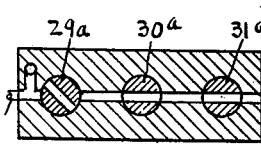
Figure 15B:
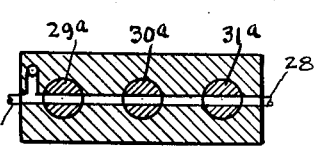
Figure 16:
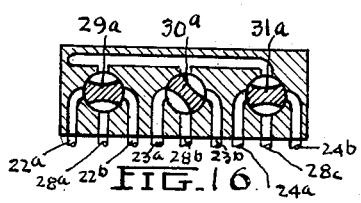
Figure 16A:
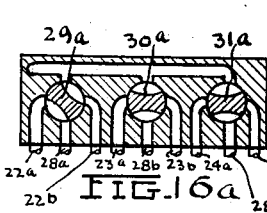
Figure 16B:
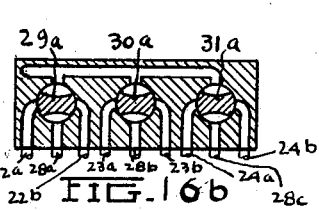

Figs. 15, 15a and 15b are likewise transverse sectional views of the valve illustrated in Fig. 12 taken on the plane substantially indicated by the line 15—15 and showing different positions for the elements of the valve in such reference plane; and Figs. 16, 16a and 16b are respectively transverse sectional views of the valve illustrated in Fig. 12 taken on the plane substantially indicated by the line 16—16 and respectively showing different positions for the elements of the valve in such reference plane.

Figure 1:
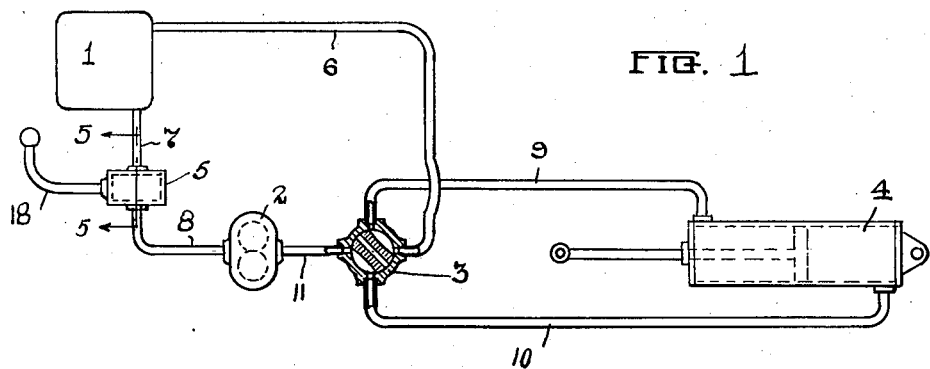
Fig. 1 is a somewhat diagrammatic representation, partially in section, of a simplified embodiment of one of the features of our invention showing particularly the control device whereby excessive re-circulation of the oil is prevented when none is required for the purpose of operating the jack.

Referring now more specifically to the drawings and more especially to Fig. 1, the hydraulic system here illustrated comprises a sump or reservoir 1, a pressure pump generally indicated at 2 which may be conveniently a conventional gear pump, a diverter valve generally indicated at 3, a jack generally indicated at 4 and a control valve generally indicated at 5. Suitable conduits of course interconnect the several elements of the hydraulic system, these being for convenience indicated by the ordinals 6, 7, 8, 9, 10 and 11.

Figures 3, 4, 5, 6, 7:
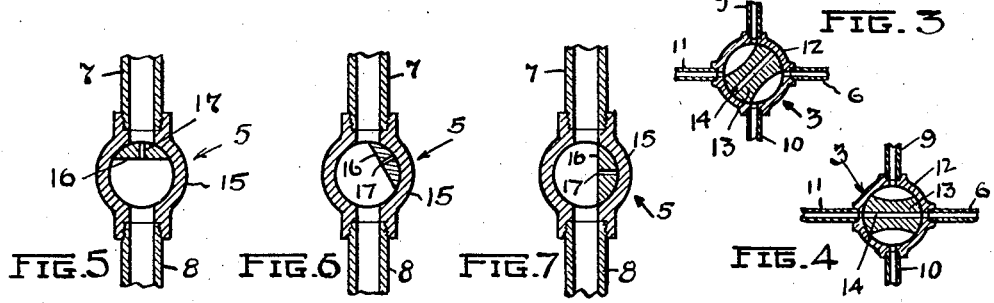
Figs. 3 and 4 are fragmentary sectional views of that portion of the apparatus illustrated in section in Fig. 1 showing, however, alternative positions for the diverter valve.
Figs. 5, 6 and 7 are respectively fragmentary sectional views showing different positions for the valve intersected by the reference plane 5—5 of Fig. 1.

As most clearly illustrated in Figs. 3 and 4, the valve generally indicated at 3 comprises a body portion 12 and a rotatable plug 13 provided with a passage 14 therethrough. When the plug 13 is in the position illustrated in Fig. 1, for example, oil delivered by the pump 2 passes through conduit 11, valve 3, conduit 10 into the right hand end of the jack 4. As the piston of the jack 4 is moved to the left the oil exhausted from the left hand end of the jack will be conveyed through the conduit 9, valve 3, conduit 6, back to the sump 1. When, however, the plug 13 is in the position illustrated in Fig. 3 the oil delivered by the pump 2 flows through conduit 11, valve 3, conduit 9 and into the left hand end of the jack 4, moving the piston thereof to the right. The oil exhausted from the right hand end of the jack 4 then flows back through the conduit 10, valve 3, conduit 6, to the sump 1. According to whether the plug 13 is set to either of the positions illustrated in Fig. 1 or 3 determines whether the jack 4 is moved to the right or left.

Now when the plug 13 of the valve 3 is moved to the position illustrated in Fig. 4, both lines 9 and 10 to the jack 4 are blocked locking the piston of the jack in the position which it occupies. At the same time conduit 11 is placed in direct communication with conduit 6 so that any oil delivered by the pump 2 is diverted directly back to the sump 1. When the valve 3 is in the position illustrated in Fig. 4, i. e. when there is no hydraulic fluid being supplied to the jack, it is obviously unnecessary to have the pump 2 do any work and theoretically the pump 2 could be stopped during this interval. Stopping the pump 2 during this interval, however, is not a practical expedient. By the inclusion of the valve 5 in the line leading from the sump to the pump 2 we are able to accomplish two principal objectives which will become apparent from an inspection of the cross-sectional views of such valve as given in Figs. 5, 6 and 7. As will be apparent from an inspection of these last-named figures, the valve 5 comprises a body 15 and a rotatable plug 16, the latter being provided with a small passage 17 which permits a slight amount of oil passage therethrough even though the plug is moved to the fully closed position. Ordinal 18 on Fig. 1 denotes the control handle by which the plug 16 may be operated.

Now the first function performed by the valve 5 is to reduce to a predetermined minimum the amount of oil which is permitted to flow from the sump 1 to the pump 2 during the time when no fluid is required to be delivered to the jack 4, i. e. when the plug 13 of the valve 3 is positioned as illustrated in Fig. 4 the opening 17 in the plug 16 of the valve 5 permits just enough fluid to pass to the pump 2 in order to maintain the same lubricated. This valve being in the supply line to the pump 2 prevents over-heating of the oil since only a sufficient amount of oil is circulated through the system to lubricate the pump.

The second and equally important function of the valve 5 is to control the amount of fluid supplied to the pump 2 in accordance with the amount desired to be delivered by the pump 2 to the jack 4, this second function being performed while the plug 13 of the valve 3 is positioned as illustrated in either Fig. 1 or 3. When the plug 16 of the valve 5 is partially closed as illustrated in Fig. 6 and the plug 13 of the valve 3 is positioned as in either of Fig. 1 or 3, the amount of oil supplied to the pump 2 and accordingly delivered by the latter to the jack 4 is reduced by a predetermined amount and the rate of movement of the piston in the jack 4 is correspondingly reduced. This control over the amount of fluid flow to the pump 2 may be regulated between the maximum amount as determined by the setting of the plug as illustrated in Fig. 7 to the minimum amount possible by a progressive closing of the plug 16. Disposing the control valve 5 in the line leading from the sump to the pump prevents forcing the oil through a constricted opening which would be the case if the valve were placed on the discharge side of the pump, and provides further advantages which will be apparent to those familiar with the art.

The foregoing is the simplest embodiment of our invention and has been illustrated and described in conjunction with the operation of a single jack.

The foregoing illustrates how a hydraulic system utilizing a volumetric valve such as 5 provides a control over the speed of movement of the jack without changing the speed of the pump. More than one jack and distributing valve such as 3 could be included in the system if desired, in which case all cylinders would be subject to the same speed changes imposed by the volumetric valve. This would provide not only the full equivalent of change speed gearing but with a wider selection of different speeds not possible with any gearing arrangement.

If now the valve 5 and the valve 3 are interconnected so that the position of the plug in the valve 3 always bears a predetermined relation to the position of the plug in the valve 5, it will be observed that a complete control is had over the movement of the jack 4 with an accomplishment in part at least of the objects of our invention, and such control system may then be operated by a single control device which not only simplifies the operator's manipulation of the same but also insures a proper coordination between the two valves at all times.

Figure 2:
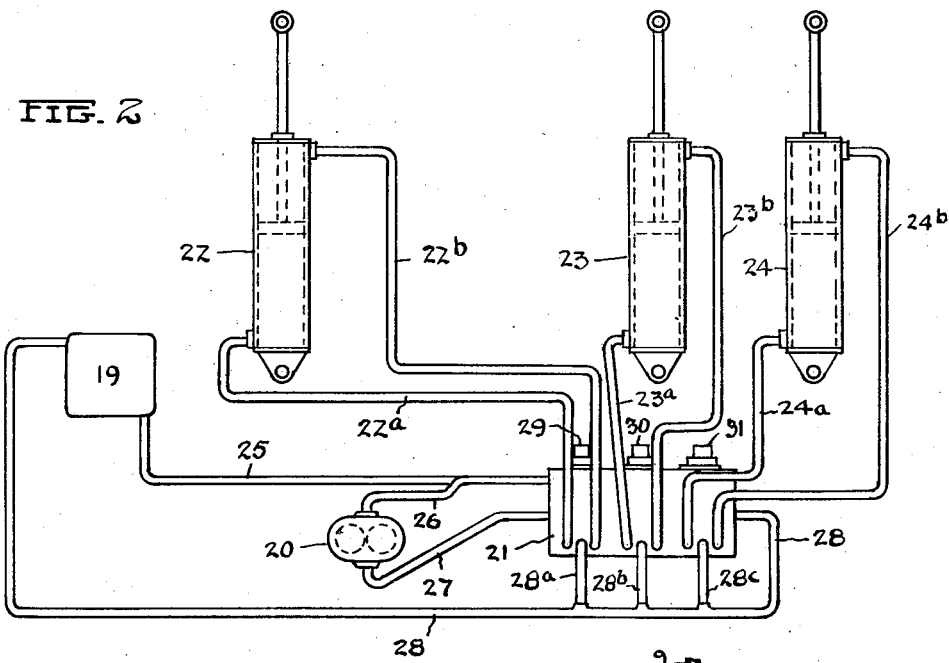
Fig. 2 is a diagrammatic representation of a complete hydraulic system embodying a plurality of jacks operated from a single control station in such a manner as to accomplish the objects of our invention.

The advantages of the control system comprising our invention may be appreciated to their fullest extent when the same is employed in conjunction with a plurality of jacks, all operated by fluid supplied by a single pressure pump and all controlled from a single station. A diagrammatic representation of such system is illustrated in Fig. 2 wherein the sump is indicated at 19, the pump at 20, a central valve at 21, separate jacks at 22, 23 and 24 respectively, with suitable conduits designated as follows. The fluid supply conduit leading from the sump 19 to the central valve 21 is indicated at 25, the supply conduit from the central valve to the pump is indicated at 26, the pressure supply conduit from the pump 20 to the central valve 21 is indicated at 27, and the return conduit to the sump 19 is indicated at 28.

The several jacks 22, 23 and 24 have conduits 22a, 23a and 24a leading from the central valve 21 to the lower ends of the respective jacks and are also provided with conduits 22b, 23b and 24b leading from the upper ends of such jacks to the central valve 21. The operation of the system as illustrated in Fig. 2 is briefly as follows, leaving a more detailed description thereof until such time as the construction and operation of the valve 21 has been more fully explained.

The hydraulic fluid flows from the sump 19 through the conduit 25 into the central valve 21. Depending upon the settings of the compound unit valve contained in the central valve a certain amount of hydraulic fluid is permitted to flow to the pump 20 through the conduit 26 and the pump then delivers the same under pressure back to the central valve 21 through the conduit 27. The fluid under pressure delivered to the central valve 21 through the conduit 27 is then by means of the compound unit valves in the central valve distributed to the selected jacks. The hydraulic fluid which is exhausted from the end of the cylinder in the jack toward which the piston thereof moves is also returned to the central valve 21 and by such valve then vented to the return conduit 28.

Figure 8:
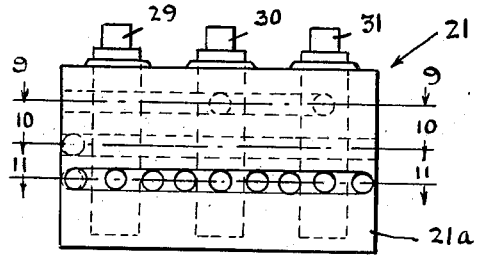
Fig. 8 is a side elevational view of the main control valve forming a part of the hydraulic system illustrated in Fig. 2.
Figure 9:
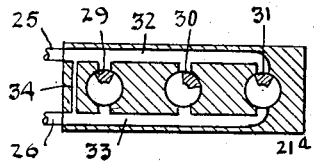
Figs. 9, 9a and 9b are transverse sectional views taken through the valve illustrated in Fig. 8 on a plane substantially indicated by the line 9—9 and showing different positions for certain of the elements of the valve.
Figure 9A:
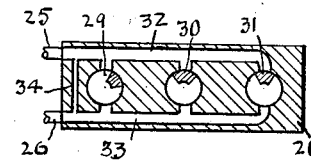
Figure 9B:
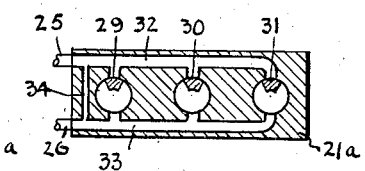

By having reference to Figs. 8 to 11b the following is a description of the construction and operation of one form of the central valve 21. The valve 21 comprises a body portion 21a which is cored or similarly provided with recesses for the reception of plugs 29, 30 and 31 and is likewise provided with passages therein in accordance with the following particulars. The supply conduit 25 from the sump 19 is connected with a passage 32 and the conduit 26 which connects the central valve 21 with the intake side of the pump 20 is connected to the passage 33. Branch passages extending between the passages 32 and 33 extend across the spaces occupied by the plugs 29, 30 and 31. In these areas such plugs have a reduced cross-sectional area, as illustrated in Figs. 9, 9a and 9b. These reduced areas of the plugs serve as valves in the branch passages which extend between the main passages 32 and 33. A small branch passage 34 likewise extends between the main passages 32 and 33 for the reasons hereinafter more fully explained.

At a lower level in the block 21a of the central valve 21, i. e. in the area of the reference plane 10—10 as illustrated in Fig. 8, there is provided a passage 36 which extends through the block with the left hand end of such passage in communication with the pressure supply conduit 27 and the right hand end of such passage in communication with the return conduit 28.

Figure 10:
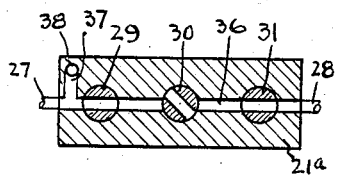
Figs. 10, 10a and 10b are similarly transverse sectional views of the valve illustrated in Fig. 8 taken on a plane substantially indicated by the line 10—10 and showing several different positions for the elements of the valve.
Figure 10A:
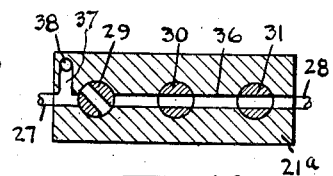
Figure 10B:
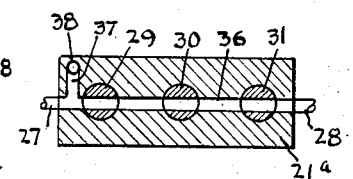
Figure 11:
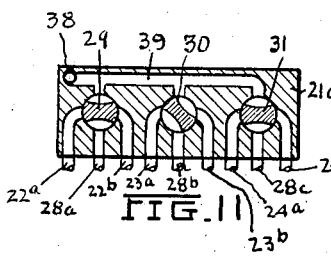
Figs. 11, 11a and 11b are respectively transverse sectional views of the valve illustrated in Fig. 8 taken on the plane substantially indicated by the line 11—11 and showing different positions for the elements of the valve in such reference plane.
Figure 11A:
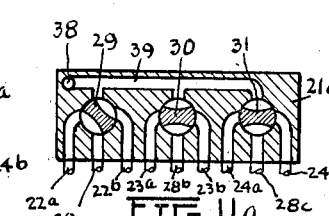
Figure 11B:
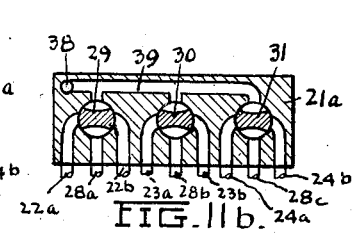

The plugs 29, 30 and 31 where they intersect the passage 36 are provided with transversely extending openings as illustrated in Figs. 10, 10a and 10b which serve as valves for such passage. Leading laterally from the passage 36 is a branch passage 37 which communicates with a vertically extending passage 38 which leads downwardly in the block 21a to a lower level, i. e. that indicated by the reference plane 11—11 in Fig. 8. The lower end of this branch duct 38 is in communication with a passage 39 with which a plurality of branch passages respectively leading to the several conduits, as indicated on Figs. 11, 11a and 11b, are associated. The lower ends of the plugs 29, 30 and 31 intersect these branch passages as illustrated. It will be recognized that the plugs 29, 30 and 31 in their areas intersected by the reference plane 9—9 serve the function of the valve 5 in Fig. 1 and that such plugs in their areas where they intersect the reference plane 11—11 serve the function of the valve 3 in Fig. 1.

More particularly, let it be assumed that the various plugs of the valve 21 are positioned as illustrated in Figs. 9, 10 and 11, and at this point it should be noted that the several plugs of the central valve are so made that Figs. 9, 10 and 11 show one setting of such plugs, Figs. 9a, 10a and 11a show another setting of such plugs and Figs. 9b, 10b and 11b show yet another setting of such plugs.

By having reference to Fig. 2 it will be observed that plug 29 is employed to control jack 22, plug 30 controls jack 23 and plug 31 controls jack 24. It will also be observed that when the plugs are positioned as illustrated in Figs. 9, 10 and 11 jacks 22 and 24 are locked out, i. e. both conduits leading to each of such jacks are closed preventing the passage to or escape or fluid at each end of such jack. Plug 30 has, however, been positioned so as to actuate its associated jack 23. Hydraulic fluid passes from the sump 19 through the conduit 25 into the passage 32 through the branch passage controlled by the plug 30 into the passage 32, the conduit 26, to the pump 20 whence it is forced from the conduit 27 into the passage 36. The passage 36 is closed off by the plug 30 causing the fluid to pass through the duct 38 into the passage 39. The blocks 29 and 31, it will be observed, seal the branch passages associated therewith. However the block 30 in the area of the reference plane 11—11 places the passage 39 in communication with the conduit 23b so that the pump 20 delivers fluid to the upper end of the jack 23. The hydraulic fluid forced out of the lower end of the jack 23 passes through conduit 23a which, it will be observed, is by the plug 30 placed in communication with the conduit 28b so that such fluid may flow back to the sump 19.

By rotating the plug 30 to various positions with respect to the block 21a the passages above described in such block which are controlled thereby may be opened or closed to any degree, depending upon the position of the plug. In this way the plug 30, particularly that portion thereof which intersects the reference plane 9—9, will function as a volumetric control similarly to the valve 5 in the simplified form of the apparatus as illustrated in Fig. 1.

If the operator should now desire to actuate the jack 22 and lock out jacks 23 and 24, he will move the three plugs into the relative positions illustrated in Figs. 9a, 10a and 11a. It will be observed that in these last named figures the plug 29 is in an open position and from the description given heretofore in connection with the passage of the fluid through the system when plug 30 is opened the operation will be apparent when plug 29 is opened. Briefly, fluid will be delivered from the sump 19 through the conduit 25 to the passage 32 where it is blocked by all but the passage controlled by the plug 29. Fluid flows through the passage 33, through the conduit 26 to the pump 20 whence it is delivered under pressure through the conduit 27 to the passage 36 which is now blocked by plug 29. The fluid therefore passes through the duct 38 to the passage 39 where it flows through the branched passage controlled by the block 29 in the reference plane 11—11, through conduit 22b to the upper end of the jack 22. Fluid exhausted from the lower end of the jack 22 passes through conduit 22a which, by means of the plug 29, is placed in communication with the passage 28a so that the fluid may flow back to the sump 19.

When all of the jacks are locked out by the several plugs being positioned as illustrated in Figs. 9b, 10b and 11b, the fluid from the sump 19 flows through the conduit 25 into the passage 32 where the small by-pass 34 permits a small amount of such fluid to flow into the passage 33. From the passage 33 such fluid flows back to the pump from conduit 26 and such amount of fluid due to the size of the passage 34 is just sufficient to keep the pump lubricated. The fluid which does however flow through the pump 20 passes through the conduit 27 back to the central valve 21 where it is now permitted to pass directly through the passage 36 into the conduit 28 and thence back to the sump 19. Passage of this lubricating fluid to the jacks is of course prevented by the positioning of the plugs in the reference plane 11—11 which from an inspection of Fig. 11b it will be observed seal off the passages leading to both ends of each of the jacks.

By the arrangement as illustrated the amount of fluid admitted to the pump for the purpose of lubricating the same is less than the capacity of the wide open passages by which the same is carried back to the sump 19. This is advantageous since no substantial amount of pressure is built up on the discharge side of the pump and consequently the fluid is prevented from over-heating.

By means of the compound valve arrangement illustrated in Figs. 8 to 11b it will be apparent that the volumetric valve portions of the several plugs which correspond to the volumetric valve 5 of the simplified embodiment of the invention as illustrated in Fig. 1 control the amount of hydraulic fluid which is admitted to the pump and which it is desired to admit to the jacks. The volumetric valves may be operated in two ways, viz.: First, they may be so operated as to vary within limits the amount of fluid which each valve admits to the pump, or, second, if the fineness of adjustment possible when operated as above is not desired the valves may be so actuated that they are moved either to the full open or full closed position. The latter mode of operation is probably the one which will be employed most often, although the operator may, if he desires, operate the system in either way. If the volumetric valves are moved to either the full open or full closed position then the size of the passages controlled thereby will be proportioned to correspond to the desired speed of operation of the jack controlled by such valves. Thus the volumetric valve portion of one plug, even when in the full open position, may admit a considerably different amount of fluid to the pump than another volumetric valve when the latter is in the full open position. By the valve arrangement illustrated in Figs. 8 to 11b the speed of any jack may therefore be accurately controlled either by a predetermined size of volumetric valve passage or by an adjustment to different positions of the volumetric valve. It will be observed that this control over the speed of operation of the several jacks is possible even with uniform speed of operation of the pressure pump. As previously indicated, the present pump will generally operate at uniform speed since the same is connected to the governor controlled prime mover on the apparatus. Generally only one jack will be operated at any one time, so that the system as illustrated in Figs. 8 to 11b provides for full flexibility of control over the several jacks when they are operated independently.

Now let it be assumed that the operator desires to actuate two jacks at the same time. Let it also be assumed that the volumetric valves for the several jacks are either so positioned or so constructed as to size of passage that they admit different amounts of fluid to the pump. Since the amount of fluid delivered to the pump is the sum total of that delivered by the several volumetric valves which are opened and if the effective cross-sectional area of the pistons in the several jacks are all the same, the opening of the volumetric valve for a fast jack is controlling insofar as the operation of all of the jacks is concerned. That is, the larger volume of the fluid admitted to the pump by the volumetric valve for the fast jack will result in the admission to the slow jack of an amount of fluid which is greater than that which would ordinarily be admitted to such slow jack by its particular volumetric valve. This is not objectionable for many types of operation.

If it should be desirable, however, to have the slow volumetric valve rather than the fast volumetric valve be the controlling factor when a plurality of valves of different capacity are opened, then an arrangement such as is illustrated in Figs. 12 to 16b may be employed.

Figure 13:
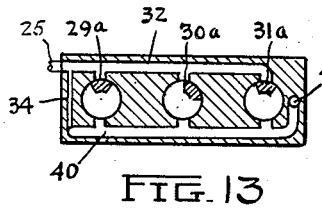
Figs. 13, 13a and 13b are transverse sectional views of the valve illustrated in Fig. 12 taken on a plane substantially indicated by the line 13—13 and showing different positions for the elements of the valve in such reference plane.
Figure 13A:
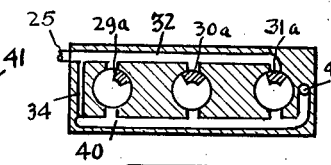
Figure 13B:
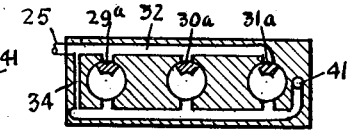
Figure 14:
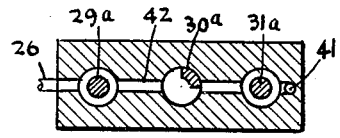
Figs. 14, 14a and 14b are likewise transverse sectional views of the valve illustrated in Fig. 12 taken on the plane substantially indicated by the line 14—14 on Fig. 12 showing different positions for elements of the valve in such reference plane.
Figure 14A:
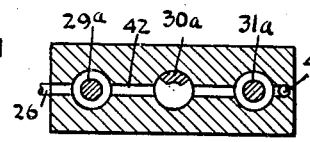
Figure 14B:
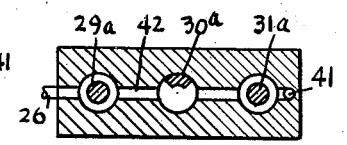

The central valve 21' illustrated in Fig. 12 is substantially identical with the valve of Fig. 8 excepting, however, that the valve 21' of Fig. 12 includes an additional reference plane represented by Figs. 14, 14a and 14b. It will be observed that in the valve of Fig. 8 the volumetric valve sections of the several plugs pass the hydraulic fluid from the passage 32 which is connected to the sump to the passage 33 which is connected to the intake side of the pump. In the valve 21' of Fig. 12 the volumetric valve portions of the several plugs pass the hydraulic fluid from the passage 32 into a passage 40 which is connected by a duct 41 to a passage 42 which is connected by means of the conduit 26 to the intake side of the pump. It will be noted that the plugs 29, 30 and 31 of the valve of Fig. 8 are for convenience identified as 29a, 30a and 31a in the valve of Fig. 12. These plugs where they intersect the reference plane 14—14 of the valve of Fig. 12 act as additional volumetric controls over the amount of fluid which is admitted to the pump. Let it be assumed that the plugs 29a and 31a are fast valves and the plug 30a is a slow valve. Under such arrangement the plugs of the fast valves would pass through the reference plane 14—14 without offering any obstruction to the passage 42 irrespective of the position of such plugs in the valve body. The slow valve block 32a is, however, provided with a section in the reference plane 14—14 which, depending upon the position of the block in the valve body, does effect a control over the amount of fluid passing through the passage 42. Since the three plugs in the reference plane 14—14 are connected in series in the passage 42 leading to the intake side of the pump, any restriction placed in such passage by the slow valve 30 will be controlling as to all of the valves. By this arrangement so long as the slow valve 30a is in the closed position, as illustrated in Fig. 13a for example, the section of the plug 30a in the reference plane 14—14 has no controlling effect on the fluid passing through the passage 42. If, however, the plug 30a is moved to open the volumetric passage control thereby in the reference plane 13—13 then immediately the section of the plug 30a in the reference plane 14—14 closes the passage 42 proportionately to the amount by which the volumetric passage in the reference plane 13—13 is opened. At this point it will be observed that the slow valve 30a is made a slow valve by virtue of the fact that a stop (not shown) is provided which prevents the plug 30a from opening any farther than illustrated in Fig. 13, since to permit a rotation of the plug 30a to the full open position as illustrated in Fig. 13 would result in completely closing the passage 42. The function of the by-pass 34 is the same in the valve 21' as in the valve 21 so that a further description thereof will not be necessary.

It will be observed that by valve means which we have illustrated and described it is possible to effect a much more selective control over a plurality of jacks operated from a single constant speed pressure pump than is possible with the controls of the prior art. By the employment of one or the other of the alternative arrangements illustrated, depending upon the particular type of apparatus which is sought to be controlled, it will be possible to achieve the control which is best suited to the apparatus with which the system is employed.

Throughout the foregoing description we have referred to "amounts" of fluid delivered by the volumetric valves to the pump and in turn by the pump to the several jacks. This terminology has been employed for convenience and it is understood that where "amounts" has been used is meant amount per unit of time or more particularly the rate at which the fluid is delivered by the several elements of the system.

At the outset of this description we have referred to the fact that our control system may be employed advantageously in conjunction with apparatus such as road working machinery, for example road graders, in which the several elements of the equipment which it is necessary to control are actuated by hydraulic jacks. It will be understood of course that our invention is not to be limited to this application of our system but that such system will be found useful wherever a plurality of jacks are actuated by a single force pump and particularly where the jacks are to operate at different speeds.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. The combination with a hydraulic system comprising a plurality of jacks, a force pump, a reservoir and suitable interconnecting conduits, of means controlling the flow of fluid to and from said jacks comprising a compound valve for each of said jacks, said compound valves each including a volumetric valve to regulate the flow of fluid from the reservoir to the pump, a by-pass valve to permit fluid flow from the discharge side of the pump directly to the reservoir when the fluid circuit to the jacks is blocked, and a diverter valve arranged to control directionally the flow of fluid between the jack associated with said valve and the pump and reservoir, the several volumetric valves being connected in parallel, the several by-pass valves being connected in series and the several directional valves being connected in parallel and all of the said valves associated with each jack arranged for simultaneous operation by means of a single control device.

2. The combination with a hydraulic system comprising a plurality of jacks, a force pump, a reservoir and suitable interconnecting conduits, of separate control means for each of said jacks comprising a volumetric valve for regulating the flow of fluid from the reservoir to the pump proportionately to the amount required to be delivered to the jack with which said valve is associated, said volumetric valves being connected in parallel, one of said valves being a slow valve adapted to permit the delivery of less fluid than the other of said valves, said slow valve being provided with an auxiliary volumetric valve intermediate said valves and said pump for limiting the delivery of fluid by all of said valves to said pump, a diverter valve for controlling the flow of fluid from said pump to the jack with which said control means is associated, and a single control device for each control means for simultaneously actuating the valves associated therewith.

3. The combination with a hydraulic system comprising a plurality of jacks, a force pump, a reservoir and suitable interconnecting conduits, of separate control means for each of said jacks comprising a volumetric valve for regulating the flow of fluid from the reservoir to the pump proportionately to the amount required to be delivered to the jack with which said valve is associated, said volumetric valves being connected in parallel, one of said valves being a slow valve adapted to permit the delivery of less fluid than the other of said valves, said slow valve being provided with an auxiliary volumetric valve intermediate said valves and said pump for limiting the delivery of fluid by all of said valves to said pump, a by-pass valve to permit fluid flow from the discharge side of the pump directly to the fluid reservoir when the fluid circuit to the jacks is blocked, the several by-pass valves being connected in series, a diverter valve for controlling the flow of fluid from said pump to the jack with which said control means is associated, the several diverter valves being connected in parallel, and a single control device for each control means for simultaneously actuating the valves associated therewith.

CLAYTON E. GIFFORD.
JOHN F. HARRISON.